United States Patent
Momoi et al.

(10) Patent No.: US 7,005,164 B2
(45) Date of Patent: Feb. 28, 2006

(54) LIQUID CRYSTAL MATERIAL, ELECTRO-OPTICAL DEVICE, LIQUID CRYSTAL DISPLAY CELL, AND LIQUID CRYSTAL DISPLAY

(75) Inventors: Yuichi Momoi, Shiga (JP); Junta Yamamichi, Yokohama (JP)

(73) Assignees: International Display Technology Co., Ltd., Shiga-ken (JP); International Business Machines Corporation, Armonk, NY (US)

(*) Notice: Subject to any disclaimer, the term of this patent is extended or adjusted under 35 U.S.C. 154(b) by 182 days.

(21) Appl. No.: 10/461,461

(22) Filed: Jun. 16, 2003

(65) Prior Publication Data
US 2004/0033320 A1    Feb. 19, 2004

(30) Foreign Application Priority Data
Jun. 14, 2002    (JP)    ............................. 2002-175040

(51) Int. Cl.
 C09K 19/54    (2006.01)
 C09K 19/52    (2006.01)
 G02F 1/1333   (2006.01)
(52) U.S. Cl. ............... 428/1.1; 252/299.01; 252/299.5; 349/84; 349/182

(58) Field of Classification Search ................ 428/1.1, 428/1.5, 1.53; 252/299.01, 299.5; 349/84, 349/182, 153, 190
See application file for complete search history.

(56) References Cited

U.S. PATENT DOCUMENTS

| 4,666,253 | A  | * | 5/1987 | Yoshida ...................... 349/132 |
| 6,379,759 | B1 | * | 4/2002 | Kamoi et al. .............. 428/1.53 |
| 6,555,187 | B1 | * | 4/2003 | Kitamura ................... 428/1.53 |

FOREIGN PATENT DOCUMENTS

| JP | HEI 11-222593 A | 8/1999 |
| JP | 2000-351974 A   | 12/2000 |

* cited by examiner

Primary Examiner—Shean C. Wu
(74) Attorney, Agent, or Firm—Sughrue Mion, PLLC (57) ABSTRACT

A conduction inhibitor including an epoxy resin or the like is mixed into a liquid crystal material. Specifically, the conduction inhibitor is formed by a bisphenol F epoxy resin, and mixing proportion is set to 0.1 wt % to 10 wt %. When such a conduction inhibitor is mixed, electrical conduction caused by ions due to an impurity or the like existing in the liquid crystal material can be suppressed, thereby maintaining a voltage holding ratio high when a liquid crystal display cell and a liquid crystal display are structured by using the liquid crystal material.

18 Claims, 8 Drawing Sheets

FIG.1

- POLARIZER 6
- 2 SUBSTRATE
- 5 POLARIZER
- 4
- 3 LIQUID CRYSTAL LAYER
- 1 SUBSTRATE

FIG.2

- SIGNAL LINE 8
- PIXEL ELECTRODE 7
- TFT ELEMENT 10
- GATE LINE 9

| CONCENTRATION (%) | 0 | 0.01 | 0.1 | 1 | 10 |
|---|---|---|---|---|---|
| Ton (ms) | 30.4 | 24.1 | 34.9 | 32.4 | 25.5 |
| Toff (ms) | 12.5 | 12.2 | 15.3 | 12.7 | 13.1 |
| Ttotal (ms) | 42.9 | 36.2 | 50.2 | 45.1 | 38.6 |

FIG.9

LIQUID CRYSTAL MATERIAL, ELECTRO-OPTICAL DEVICE, LIQUID CRYSTAL DISPLAY CELL, AND LIQUID CRYSTAL DISPLAY

BACKGROUND OF THE INVENTION

1) Field of the Invention

The present invention relates to a liquid crystal layer having a satisfactory voltage holding ratio.

2) Description of the Related Art

Conventionally, in a field of image display devices, an image display device that uses a change in alignment of liquid crystal molecules (hereinafter, referred to as "liquid crystal display") has been known. The liquid crystal display includes a liquid crystal display cell having a liquid crystal layer sealed into between two glass substrates arranged in an opposed manner. The liquid crystal display displays an image in such a manner that a predetermined electric field is applied to the liquid crystal molecules forming the liquid crystal layer to change the alignment of the liquid crystal molecules and the light transmittance of the liquid crystal layer.

Specifically, in the conventional liquid crystal display, a pixel electrode is provided on a glass substrate correspondingly to a display pixel, and a switching element including thin film transistor (TFT) or the like is arranged on each of the pixel electrodes. The pixel electrode has a storage possible structure such that a common electrode arranged on the opposed glass substrates and a liquid crystal layer sandwiched between both the electrodes form a capacitor. When a current flown in from outside via the switching element stores charges on the capacitor, a predetermined electric field is applied to the liquid crystal molecules so that the alignment of the liquid crystal molecules changes and the light transmittance changes, thereby enabling image display. The charges stored on both the electrodes are held even after the switching element is turned OFF, and therefore a state such that the alignment of the liquid crystal molecules has been changed is maintained until the switching element is again turned ON so as to collect the charges, thereby maintaining the displayed image.

With the above structure, the liquid crystal display has excellent characteristics such as space saving, low voltage operation, and low power consumption due to its thinner structure as compared to those of a CRT display or the like using a cathode-ray tube. The liquid crystal display is becoming remarkably widespread as an image display device in a personal computer, a personal digital assistant, and the like.

In order to maintain a displayed image, a liquid crystal material for the liquid crystal display needs to have a high voltage holding ratio. The reason for this is that when the liquid crystal material has electrical conductivity, a current flows between electrodes forming a capacitor, and an electric field intensity applied to a liquid crystal layer is weakened. Therefore, the alignment of liquid crystal molecules is disordered, which interferes with image display.

In general, it is known that the liquid crystal molecule itself does not have the electrical conductivity, an impurity or the like mixed with the liquid crystal material resolves to produce ions. The produced ions function as a conductive carrier in the liquid crystal material so that the electrical conductivity is generated between the electrodes, thereby lowering the voltage holding ratio. Therefore, how to lower concentration of the impurity in the liquid crystal material has been studied in order to realize the high voltage holding ratio.

Conventionally, to increase the voltage holding ratio, a fluorine-based nematic liquid crystal material is adopted and a cleanliness of a manufacturing line is improved. The reason why the fluorine-based nematic liquid crystal material is adopted is that this material has an advantage that impurity solubility of this material is much smaller than that in another liquid crystal materials. The mixed impurity resolves in the liquid crystal material to be ionized, and thereby the liquid crystal material exhibits the electrical conductivity. Therefore, low impurity solubility makes it possible to decrease the electrical conductivity, thereby improving the voltage holding ratio. By improving the cleanliness of the manufacturing line, a quantity of the impurities to be mixed can be suppressed, thereby improving the voltage holding ratio.

However, the improvement in the voltage holding ratio based on the conventional technology still has a problem. Firstly, the concentration of the impurity is suppressed to a value not more than predetermined concentration at the time of manufacturing based on the conventional technology. Further, even if electrical conduction in liquid crystal can be suppressed, there still remains a problem that the voltage holding ratio is lowered according to long-time use. This is because it is considered that an impurity of an uncured component of a material around the liquid crystal layer, a metal ion included in moisture intruding into the liquid crystal layer, or the like gradually intrudes inside the liquid crystal layer. Therefore, even if the liquid crystal material has the high voltage holding ratio just after the manufacturing, the voltage holding ratio is gradually lowered, and thus a problem such that unevenness occurs in a displayed image is elicited.

There is another problem such that a degree of freedom in relation to a selection of liquid crystal materials is limited. For example, in order to realize low-operating voltage and high-speed response, the use of a liquid crystal material having high dielectric constant anisotropy is proposed. However, the liquid crystal material having high dielectric constant anisotropy that is known so far, has high impurity solubility, and therefore dissolution of the impurity cannot be suppressed unlike the above case. Consequently, when the liquid crystal material having the high dielectric constant anisotropy is used in the liquid crystal display, it is necessary to use a method different from any conventional method in order to improve the voltage holding ratio.

There is still another problem that cleaning of the manufacturing line is not easy in actual cases. Since the mixing of the impurity into the liquid crystal material occurs mainly when the liquid crystal material is manufactured and is filled into a cell, it is necessary to clean the manufacturing line at these steps to the limit. In order to achieve this, for example, it is necessary to frequently clean a filling apparatus used for filling the liquid crystal material into the cell. This makes the manufacturing steps complicated, and thus the manufacturing cost rises.

As explained above, according to the conventional method, it is not easy to suppress the mixing of the impurity into the liquid crystal material, and it is difficult to keep the high voltage holding ratio. It is, therefore, necessary to keep the high voltage holding ratio based on a viewpoint other than that the concentration of the impurity is lowered.

SUMMARY OF THE INVENTION

It is an object of this invention to solve at least the problems in the conventional technology.

The liquid crystal material according to one aspect of the present invention includes liquid crystal molecules and a conduction inhibitor that inhibits electrical conduction due to an ionic substance floating in vicinity of the liquid crystal molecules.

The electro-optical device according to another aspect of the present invention includes a plurality of substrates each of which has an electrode and which are arranged in an opposed manner so as to be separated by a predetermined distance from each other, and a liquid crystal layer formed by a liquid crystal material sealed between the substrates. The liquid crystal material includes liquid crystal molecules, and a conduction inhibitor that inhibits electrical conduction due to an ionic substance floating in vicinity of the liquid crystal molecules.

The liquid crystal display cell according to still another aspect of the present invention includes a first substrate having a plurality of electrodes on an inner surface of the first substrate, a second substrate arranged so as to be separated from the first substrate by a predetermined distance and be opposed to the first substrate, and a liquid crystal layer that is sealed into a region formed by the inner surface of the first substrate and an inner surface of the second substrate and is formed by a liquid crystal material. The liquid crystal material includes liquid crystal molecules, and a conduction inhibitor that inhibits electrical conduction due to an ionic substance floating in vicinity of the liquid crystal molecules.

The liquid crystal display according to still another aspect of the present invention includes a liquid crystal display cell. The liquid crystal display cell includes a first substrate having a plurality of electrodes on an inner surface of the first substrate, a second substrate arranged so as to be separated from the first substrate by a predetermined distance and be opposed to the first substrate, and a liquid crystal layer that is sealed into a region formed by the inner surface of the first substrate and an inner surface of the second substrate and is formed by a liquid crystal material. The liquid crystal material includes liquid crystal molecules, and a conduction inhibitor that inhibits electrical conduction due to an ionic substance floating in vicinity of the liquid crystal molecules. The liquid crystal display also includes a voltage applying unit that is electrically connected with the electrodes arranged on the liquid crystal display cell and applies a predetermined voltage to the electrodes, and a control unit that controls the voltage applying unit based on image information input from outside. The liquid crystal display further includes a frame member that has the liquid crystal display cell, the voltage applying unit, and the control unit provided therein, and that has a display window for defining an effective display screen area.

The other objects, features and advantages of the present invention are specifically set forth in or will become apparent from the following detailed descriptions of the invention when read in conjunction with the accompanying drawings.

DETAILED DESCRIPTIONS

Exemplary embodiments of the liquid crystal material, the liquid crystal display cell, and the liquid crystal display according to the present invention are explained below with reference to the drawings. Same or similar reference numerals are assigned to those that are the same or similar parts to one another in the drawings. Moreover, the drawings are typical, and it is necessary to regard that a relationship between a thickness and a width of the parts, a size ratio of the parts, and the like are different from actual ones. Naturally, the drawings include parts in which a relationship and a ratio in dimensions are different between the drawings.

Figure 1:
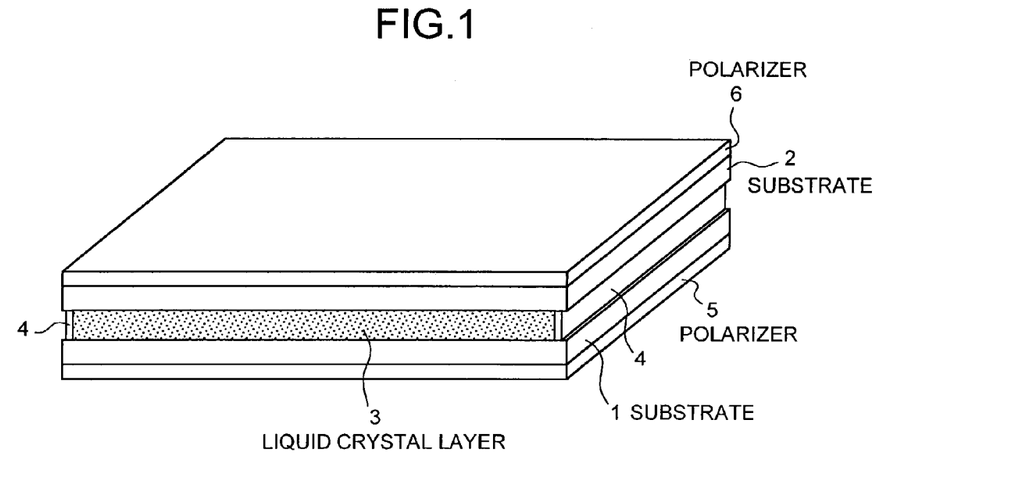
FIG. 1 is a perspective view of a liquid crystal display cell according to a first embodiment of this invention.

A liquid crystal display cell according to a first embodiment of this invention is explained below. The liquid crystal display cell has a structure such that a substance for suppressing the electrical conduction is mixed with the liquid crystal material to realize a high voltage holding ratio. FIG. 1 is a perspective view of a structure of the liquid crystal display cell according to the first embodiment. A detailed structure of the liquid crystal display cell is explained below.

The liquid crystal display cell according to the first embodiment is formed, as shown in FIG. 1, so that a substrate 1 and a substrate 2 each having an approximately rectangular shape from a plan view are arranged approximately parallel to each other spaced by a predetermined distance. A liquid crystal material is sealed between the substrate 1 and the substrate 2 to form the liquid crystal layer 3, and a seal portion 4 is arranged on a peripheral edge of the liquid crystal layer 3. The liquid crystal display cell further has a structure such that a polarizer 5 is arranged below the substrate 1 and a polarizer 6 is arranged on the substrate 2. In order to hold the distance between the substrates 1 and 2 constant, a spacer formed by particles or the like, a pillar-shaped permanent spacer, or the like, not shown, is sandwiched between the substrates 1 and 2.

The seal portion 4 is used for bonding the substrates 1 and 2, and for preventing the sealed liquid crystal material from leaking. Although FIG. 1 shows a portion where the seal portion 4 does not exist on the peripheral edge of the liquid crystal layer 3, this simplifies the explanation in relation to the structure of the liquid crystal display cell according to the first embodiment. Actually, the peripheral edge of the liquid crystal layer 3 is entirely surrounded by the seal portion 4. However, an inlet may be provided on a part of the peripheral edge of the liquid crystal layer 3 in order to fill the liquid crystal material at the time of manufacturing if required.

The polarizers 5 and 6 allow only polarized light in a predetermined direction of light entering from a lower portion of the liquid crystal display cell to pass. In the first embodiment, the polarizers 5 and 6 are arranged so that a polarizing axis of the polarizer 5 intersects perpendicularly to a polarizing axis of the polarizer 6, that is, in a cross nicol state, but the structure may be such that the polarizers 5 and 6 are arranged in a parallel nicol state. A predetermined alignment film, not shown, is arranged on the polarizers 5 and 6 so as to be in contact with the liquid crystal layer 3. Such an alignment film has anisotropy in a surface structure by performing rubbing treatment in a predetermined direction, and liquid crystal molecules forming the liquid crystal layer 3 are aligned by the anisotropy.

The substrates 1 and 2 are formed by a water-clear no-alkali glass. The no-alkali glass is a glass having a composition in which content of an alkaline substance such as $Na_2O$ and $K_2O$ is not more than 0.8 wt %. The substrates 1 and 2 have a shape with excellent flatness so as not to refract light entering from the lower portions, and have a low coefficient of thermal expansion. As the substrates 1 and 2, a plastic substrate, silica glass, or the like may be used according to applications.

Figure 2:
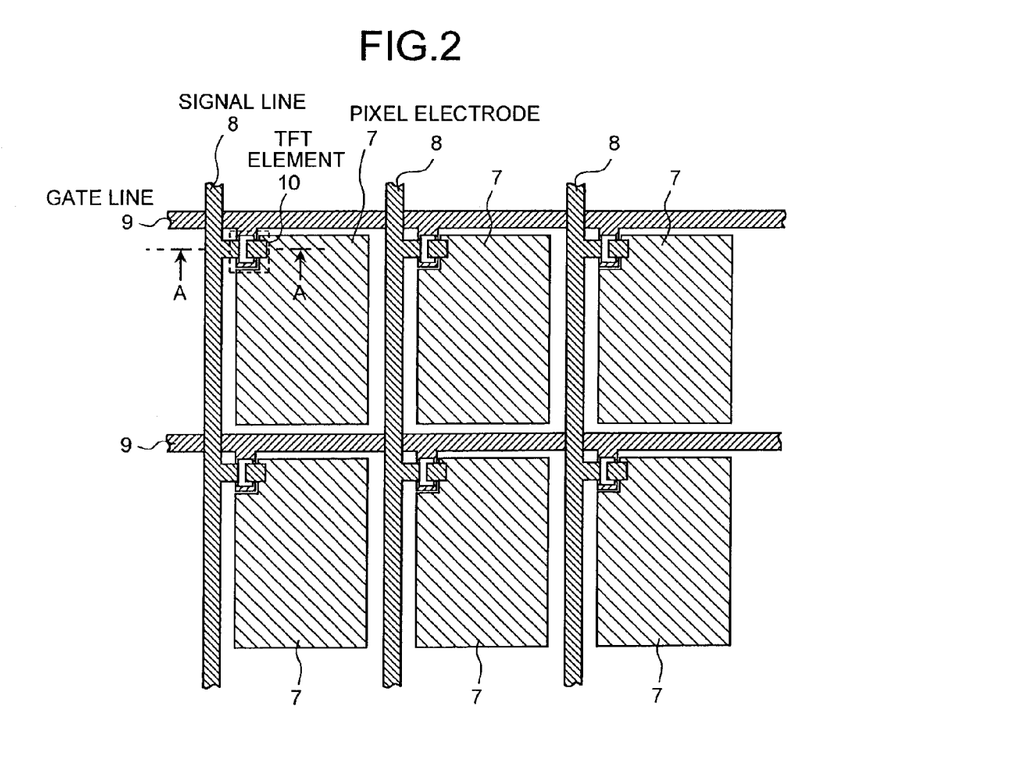
FIG. 2 is a partial top view of a wiring pattern on substrates forming the liquid crystal display cell according to the first embodiment.

FIG. 2 is a schematic diagram of a part of the structure provided on an upper surface of the substrate 1. As shown in FIG. 2, a plurality of pixel electrodes 7 are arranged in a matrix on the surface of the substrate 1, and a TFT element 10 is arranged on each of the pixel electrodes 7. The TFT element 10 has a gate electrode, a source electrode, and a drain electrode, and the pixel electrode 7 is electrically connected with the drain electrode of the TFT element 10. An arrangement of the pixel electrodes 7, a number, and an area of the pixel electrodes 7 to be arranged correspond to an arrangement of the pixels in the liquid crystal display cell according to the first embodiment. In this liquid crystal display cell, the single TFT element 10 is arranged on each of the pixels, but a plurality of the TFT elements can be arranged on each of the pixels.

Signal lines 8 are further arranged between the pixel electrodes 7 in a longitudinal direction of the liquid crystal display cell, and gate lines 9 are arranged in a lateral direction thereof. The signal lines 8 and the gate lines 9 are used for applying predetermined voltages to the TFT elements 10. Specifically, the signal line 8 is electrically connected with the source electrodes of the adjacent TFT elements 10, and the gate line 9 is electrically connected with the gate electrodes of the adjacent TFT elements 10. These lines can apply voltages to the TFT elements 10.

Figure 3:
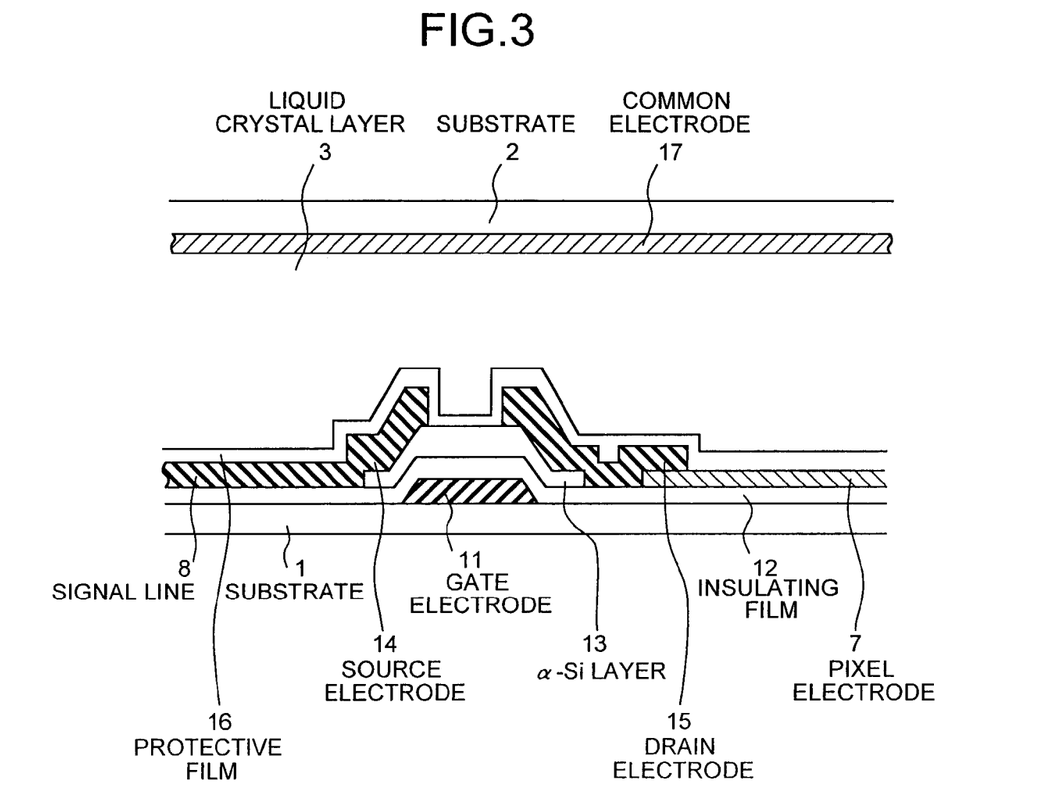
FIG. 3 is a sectional view along line A—A shown in FIG. 2.
Figure 4A:
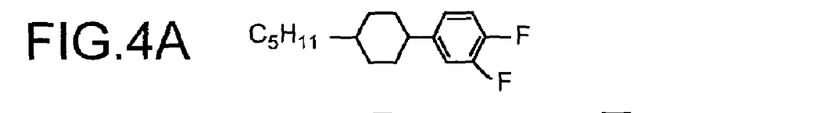
FIGS. 4A to 4M show liquid crystal molecules composing a liquid crystal material forming a liquid crystal layer in the first embodiment.
Figure 4B:
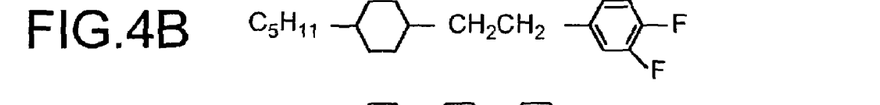
Figure 4C:
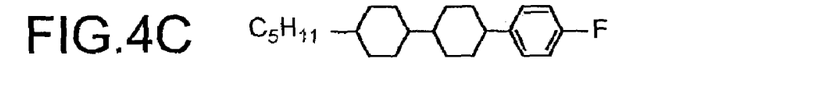
Figure 4D:
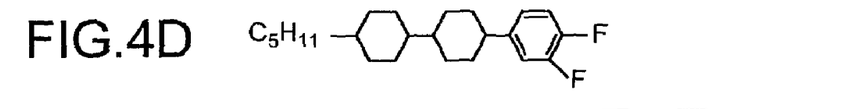
Figure 4E:
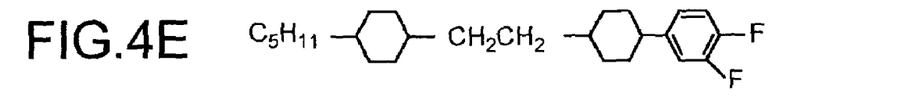
Figure 4F:
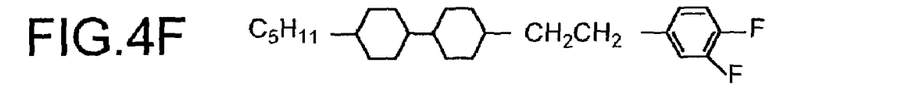
Figure 4G:
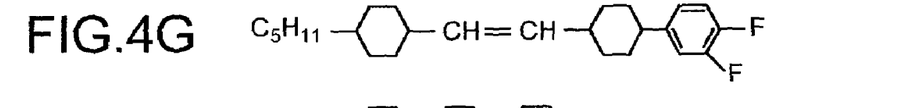
Figure 4H:
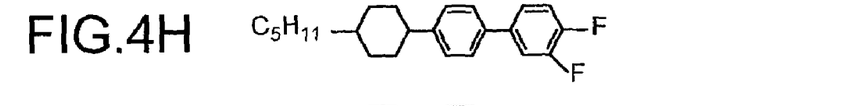
Figure 4I:
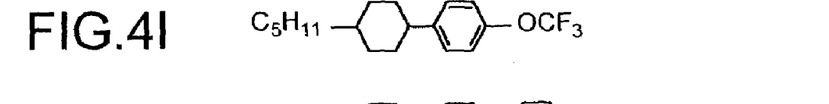
Figure 4J:
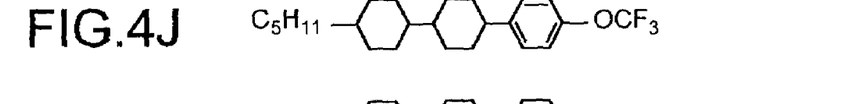
Figure 4K:
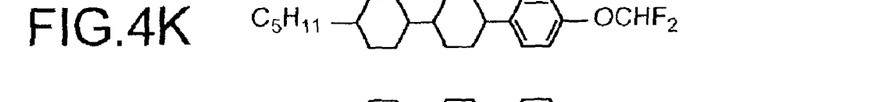
Figure 4L:
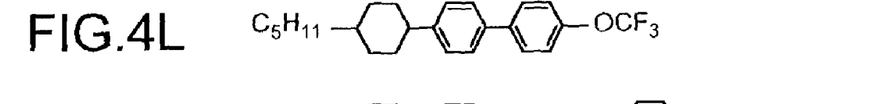
Figure 4M:
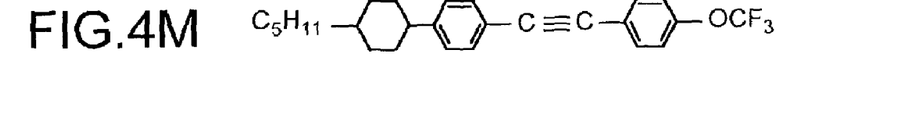

A detailed structure of the TFT element 10 is explained below with reference to FIG. 3. FIG. 3 is a sectional view taken along line A—A shown in FIG. 2. FIG. 3 shows not only the upper surface of the substrate 1 but also the liquid crystal layer 3 and the substrate 2. As shown in FIG. 3, the gate electrode electrically connected with the gate line 9 is laminated on a partial area on the substrate 1, and an insulating film 12 is deposited on the substrate 1 and the gate electrode 11. An α-Si layer 13 made of amorphous silicon is laminated on the insulating film 12 in an area above the gate electrode 11. The α-Si layer 13 may be formed of polysilicon, monocrystal silicon, or the like other than the amorphous silicon.

Further, a source electrode 14 and a drain electrode 15 are laminated on the α-Si layer 13 so as to be separated from each other. The source electrode 14 is electrically connected with the signal line 8, and the drain electrode 15 is electrically connected with the pixel electrode 7. A protective film 16 for protecting the surface is deposited on the signal line 8, the TFT element 10, and the pixel electrode 7. The substrate 2 is arranged above the TFT element 10 and the pixel electrode 7 via the liquid crystal layer 3, but a common electrode 17 is arranged over the entire surface of the substrate 2 on the liquid crystal layer 3 side. The liquid crystal layer 3 having a high voltage holding ratio functions as a dielectric, and thereby the pixel electrode 7, the common electrode 17, and the liquid crystal layer 3 sandwiched therebetween form a capacitor.

The liquid crystal layer 3 is explained below. The liquid crystal layer 3 is formed by sealing the liquid crystal material between the substrates 1 and 2. The liquid crystal material contains predetermined liquid crystal molecules and a conduction inhibitor for suppressing the electrical conduction in the liquid crystal layer 3. The liquid crystal molecules are explained first, and then the conduction inhibitor is explained in detail.

FIGS. 4A to 4M exemplify specific liquid crystal molecules that can be used in the first embodiment. As shown in FIGS. 4A to 4M, it is general that fluorine-based nematic liquid crystal molecules are used in the liquid crystal display cell using TFT. In the molecules exemplified in FIGS. 4A to 4M, the molecules having a monofluoro group and a difluoro group are mainly used. However, the liquid crystal molecules having substituents such as a trifluoromethyl group ($—CF_3$), a trifluoromethoxy group ($—OCF_3$), and a difluoromethoxy group ($—CF_2H$) may be used as the liquid crystal molecules to which an attention is paid in recent years. The liquid crystal molecular structures shown in FIGS. 4A to 4M are only examples, and liquid crystal molecules having a structure not shown in these figures may as well be used as a main component of the liquid crystal material. Not only a single component but also a multi-component in which plural kinds of liquid crystal molecules are mixed may be used as the main component of the liquid crystal material.

The conduction inhibitor will be explained below. The conduction inhibitor adsorbs ions and fulfills another functions so as to inhibit the electrical conduction due to an impurity and improve the voltage holding ratio of the liquid crystal layer 3. The conduction inhibitor is specifically formed by, for example, an epoxy resin. The epoxy resin is a resin having not less than two epoxy groups in one molecule.

The epoxy resin is classified into a phenolic glycidyl ether type, an alcoholic glycidyl ether type, a glycidyl ester type, a glycidyl amine type, a glycidyl mesogen type, a mixed type, and the like. As the conduction inhibitor, particularly the epoxy resin having the glycidyl group is preferable, and the phenolic glycidyl ether type epoxy resin is more preferable. This is because the epoxy resin having the glycidyl group generally has excellent electrical insulating properties, and particularly the phenolic glycidyl ether type epoxy resin has notable electrical insulating properties, thereby suppressing the electrical conduction in the liquid crystal layer 3 effectively and maintaining the voltage holding ratio high.

It is preferable that the molecular structure of the conduction inhibitor is a one-dimensional structure in the liquid crystal material. This is because when the conduction inhibitor has the molecular structure similar to the liquid crystal molecules, the conductor inhibitor is easily mixed with the liquid crystal material since the liquid crystal molecules generally have the one-dimensional structure. The one-dimensional structure provides an advantage such that the motion of the liquid crystal molecules is not inhibited. That is to say, it is speculated that when the alignment of the liquid crystal molecules changes due to the electric field applied to the liquid crystal layer 3, the mixed molecules of the conduction inhibitor do not function as any inhibiting factor in the motion of the liquid crystal molecules. It is, therefore, considered that when particularly the molecular structure of the conduction inhibitor is the one-dimensional structure, the liquid crystal molecules are not influenced by the molecules of the conduction inhibitor from viewpoints of a response speed to voltage application and of a critical voltage that is a voltage at which the alignment of the liquid crystal molecules is changed.

It is preferable that a weight of the molecules composing the conduction inhibitor is similar or less than that of the liquid crystal molecules. This is because the molecules composing the conduction inhibitor has a size similar to or less than that of the liquid crystal molecules, thereby further reducing an influence given to the motion of the liquid crystal molecules.

It is preferable that a viscosity of the substance itself of the conduction inhibitor is not more than about 3000 poise at a temperature at which the liquid crystal material exhibits liquid crystal property. This is because when any substance has the viscosity larger than 3000 poise, it is difficult to mix the substance with the liquid crystal material practically uniformly. When the substance cannot be mixed with the liquid crystal molecules in the liquid crystal material practically uniformly, it is difficult that the substance functions as the conduction inhibitor, and thus the substance possibly influences the motion of the liquid crystal molecules as an impurity.

After considering the above conditions in relation to the conduction inhibitor, the inventors of this application consider that, for example, a bisphenol F epoxy resin or a bisphenol A epoxy resin is suitable as the substance to be used as the conduction inhibitor. A specific structure of the bisphenol F epoxy resin is shown in the following formula (1), and a specific structure of the bisphenol A epoxy resin is shown in the following formula (2).

voltage holding ratio is improved even if a lower limit value of the quantity of the conduction inhibitor to be mixed is 0.01 wt % in an example, described later, and that the functions of maintaining and improving the voltage holding ratio is fulfilled more effectively as the concentration rises from 0.1 wt % to 1 wt %. An upper limit value of the quantity is mainly determined by a limit of the solubility. Therefore, not less than 10 wt % of the conduction inhibitor can be mixed with the liquid crystal molecules depending on a combination of the liquid crystal molecules and the conduction inhibitor. This case provides a more satisfactory effect as to the voltage holding ratio.

Figure 5:
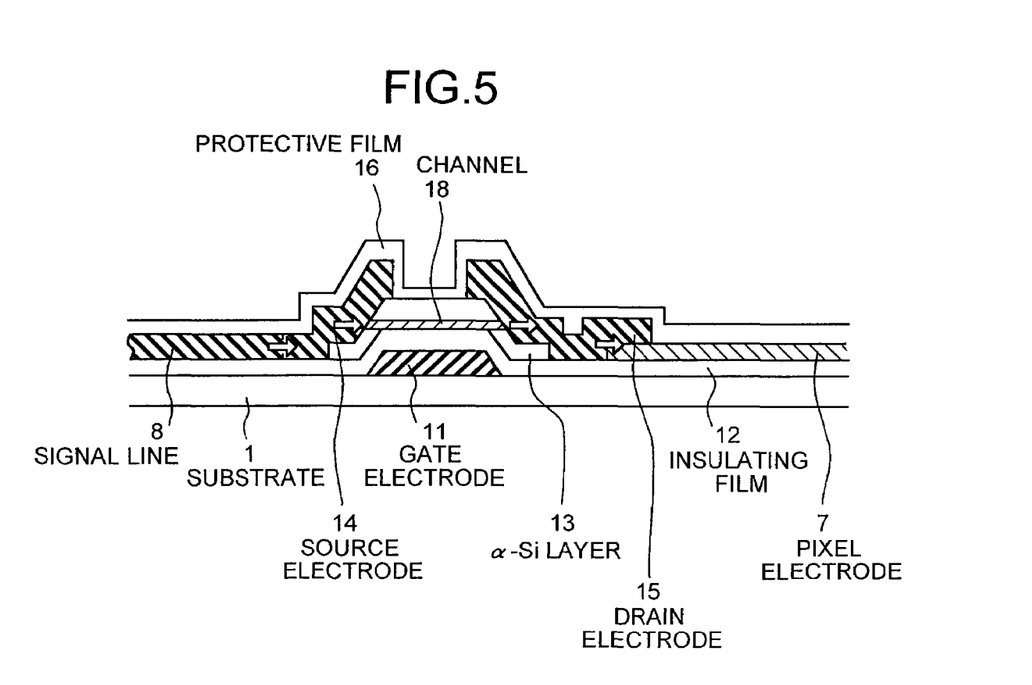
FIG. 5 is a schematic diagram of an operation for applying a voltage to a pixel electrode in the liquid crystal display cell according to the first embodiment.

An operation of the liquid crystal display cell according to the first embodiment is briefly explained below. FIG. 5 is a schematic diagram of an operation of the TFT element 10 particularly in the operation of the liquid crystal display cell. Arbitrary signal line 8 and gate line 9 are selected from lines arranged on the substrate 1 and a voltage is applied to the selected lines, and thereby charges are stored on the pixel electrode 7 from the source electrode 14 shown in FIG. 5.

Specifically, at least a predetermined amount of voltage is applied to the gate electrode 11 via the gate line 9, thereby inducing a channel 18 in the α-Si layer 13. When the channel 18 is induced, the source electrode 14 and the drain electrode 15 are conducted. Since the voltage is applied to the source electrode 14 via the signal line 8, the charges are carried from the source electrode 14 via the channel 18 and the drain electrode 15 to be stored on the pixel electrode 7. Since the pixel electrode 7 forms the capacitor between the liquid crystal layer 3 and the common electrode 17, the charges are stored on the pixel electrode 7. Therefore, a predetermined electric field is applied to the liquid crystal layer 3 to change These substances satisfy any of the above conditions. This is because, as shown in the formulas (1) and (2), these substances have the epoxy group, particularly the glycidyl group, and are classified as the phenolic glycidyl ether type epoxy resin, and their molecular structure is the one-dimensional structure. Particularly, in the formulas (1) and (2), it is preferable that $0 \leq n \leq 1$, and n=0 is more preferable. In this case, the molecular weight becomes similar to or less than the molecular weight of the liquid crystal molecules exemplified in FIGS. 4A to 4M, and these substances satisfy a condition such that the viscosity is not more than about 3000 poise at the operating temperature of the liquid crystal.

In the present invention, a quantity of the conduction inhibitor to be mixed with the liquid crystal material is preferably not less than 0.01 wt % and not more than about 10 wt %, and more preferably 0.1 wt % to 10 wt %. It is further preferable that the quantity is in a range between 1 wt % and 10 wt %. This understanding is based on that the the alignment of the liquid crystal molecules. Since the liquid crystal display cell according to the first embodiment has the structure such that the conduction inhibitor is mixed with the liquid crystal material, the liquid crystal display cell has the high voltage holding ratio, and the liquid crystal molecules whose alignment changes is maintained in its state satisfactorily. This operation is performed on all the pixel electrodes 7 arranged in the matrix by sequentially switching the signal lines 8 and the gate lines 9, and thereby a predetermined pattern is formed on the liquid crystal layer 3 and an image is displayed by irradiating light from the outside to the liquid crystal display cell.

EXAMPLE

An example of the liquid crystal display cell using the bisphenol F epoxy resin in which n=0 as the conduction inhibitor is explained below. The specific structure of the liquid crystal display cell shown in FIGS. 1 to 3 is used here, and the fluorine-based nematic liquid crystal manufactured by Merck & Co., Inc. is used as the liquid crystal material forming the liquid crystal layer 3. In this example, a plurality of liquid crystal display cells each in which the concentration of the conduction inhibitor is changed were manufactured. Specifically, the liquid crystal display cells are manufactured in such a manner that the concentration of the conduction inhibitor is changed to 0 wt %, 0.01 wt %, 0.1 wt %, 1.0 wt %, and 10 wt %. The liquid crystal display cell in which the concentration of the conduction inhibitor is 0 wt % is manufactured as an example for comparison used to make sure the function of the conduction inhibitor. Since the completely identical structure is adopted in these liquid crystal display cells except for the concentration of the conduction inhibitor, it is considered that a difference in characteristics results from the conduction inhibitor.

Figure 6:
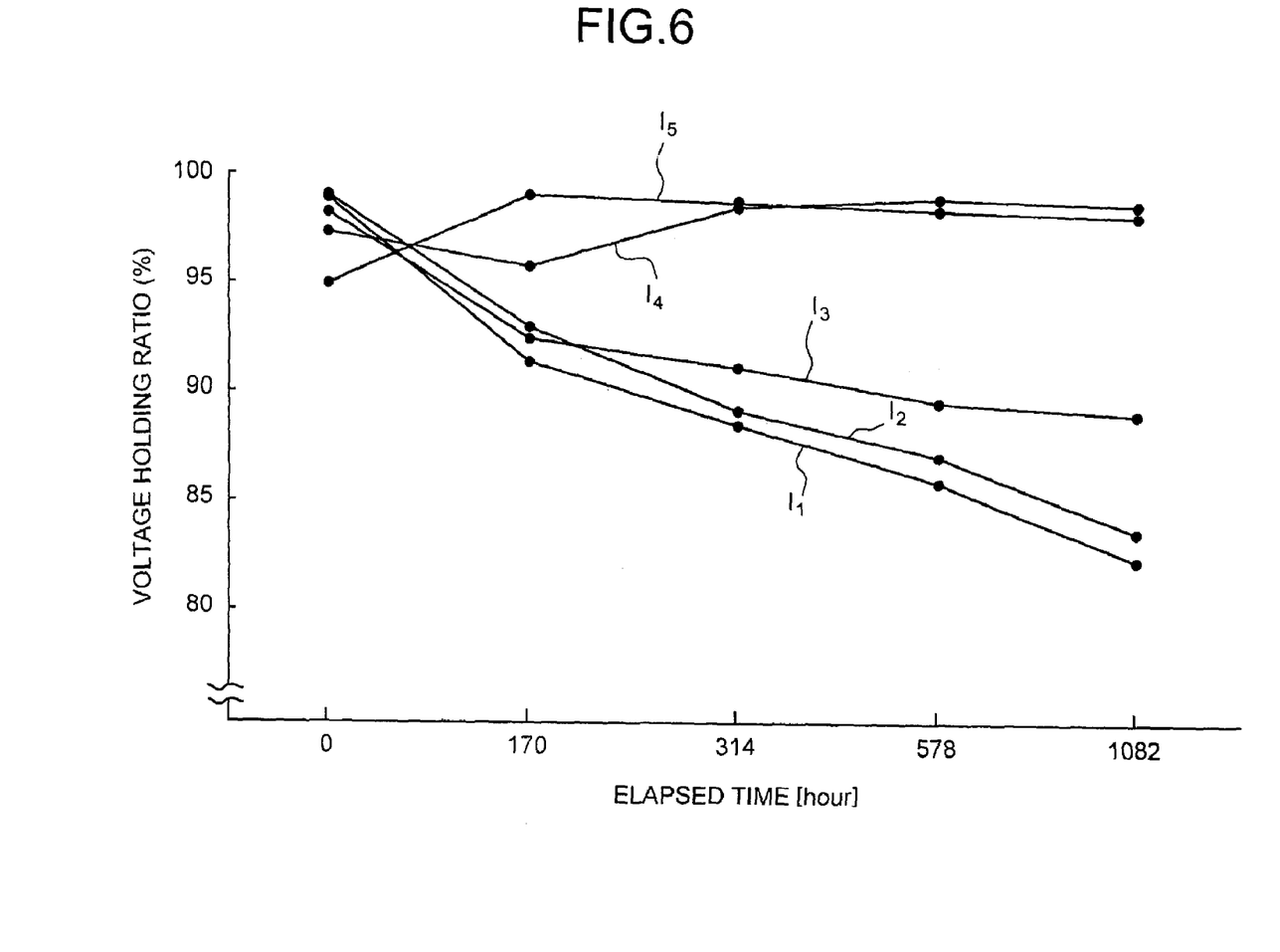
FIG. 6 is a graph of fluctuations in a voltage holding ratio due to an accelerated test in relation to the liquid crystal display cell according to an example.

A time for which the liquid crystal display cells were left under the condition in which humidity was 80% and temperature was 50° C. was changed and an accelerated test was conducted, and the voltage holding ratio of the liquid crystal layer 3 was measured. FIG. 6 is a graph of results of measuring the voltage holding ratio, and the horizontal axis of the graph shows elapsed time and the vertical axis thereof shows the voltage holding ratio.

In this measurement, the voltage holding ratio was obtained by expressing a ratio between a first voltage and a second voltage by a percentage. More specifically, the first voltage was applied from an external power source, and the second voltage remained after 16 ms elapsed from the time at which the first voltage was applied. For example, when the remaining voltage is equal to the applied voltage, the voltage holding ratio becomes 100%. The reason why a measuring interval is set to 16 ms is that the liquid crystal display into which the liquid crystal display cell is incorporated generally has a structure that a voltage is again applied to the liquid crystal layer 3 after a period of 60 Hz, that is, after 16 ms in order to display a different image. The reason why the accelerated test is conducted is that the liquid crystal cell is brought into a state that is equivalent to a state of its long-time use. That is to say, by conducting the accelerated test, impurity ions or moisture gradually intrudes into the liquid crystal layer 3 from peripheral members, and the concentration of the impurity in the liquid crystal layer 3 increases. Thus, it is possible to detect whether the conduction inhibitor is effective.

On the graph of FIG. 6, a curved line $l_1$ shows a change in the voltage holding ratio of the liquid crystal display cell in which the concentration of the conduction inhibitor is 0 wt %. Likewise, a curved line $l_2$, a curved line $l_3$, a curved line $l_4$, and a curved line $l_5$ show changes in the voltage holding ratio of the liquid crystal cells in which the concentration of the conduction inhibitor is 0.01 wt %, 0.1 wt %, 1.0 wt %, and 10 wt %, respectively. As is apparent from the curved line $l_1$ on the graph of FIG. 6, in the case of the liquid crystal display cell in which the concentration of the conduction inhibitor is 0 wt %, namely, the liquid crystal layer 3 does not include the conduction inhibitor, the voltage holding ratio is lowered as the time goes. This is because the impurity ions in the liquid crystal gradually increase since the impurity ions of the uncured component intrude from the peripheral material forming the liquid crystal display cell into the liquid crystal layer 3 or moisture intrudes from the periphery into the liquid crystal layer 3 under a steamy environment and also metal ions in the air are mixed into the liquid crystal layer 3.

On the other hand, when 0.01 wt % of the conduction inhibitor is mixed with the liquid crystal layer 3 (curved line $l_2$), the value of the voltage holding ratio is slightly larger than a value at the time when the liquid crystal layer 3 does not include the conduction inhibitor at all the elapsed times. Likewise, when 0.1 wt % of the conduction inhibitor is mixed with the liquid crystal layer 3, that is, on the curved line $l_3$, the lowering of the voltage holding ratio is further suppressed. Most notable effect occurs when 1.0 wt % and 10 wt % of the conduction inhibitors are mixed. As is apparent from the curved lines $l_4$ and $l_5$, the voltage holding ratio holds a value that is approximately 99% or more regardless of the elapsed time. On the curved line $l_4$, the voltage holding ratio is once lowered to about 96% after 170 hours passes, but this value is practically sufficient.

According to the results of the measurement, the liquid crystal display cell in which the conduction inhibitor is mixed with the liquid crystal material shows the effect such that the lowering of the voltage holding ratio is suppressed. Since the liquid crystal display cells used for the measurement are identical to each other except for the concentration of the conduction inhibitor, quantities of impurities to intrude into the respective liquid crystal display cells do not differ. Therefore, in the case of the curved lines $l_2$ to $l_5$, the equal quantity of impurities to the case of the curved line $l_1$ intrudes into the liquid crystal layer 3, but it can be concluded that the conduction inhibitor suppresses the electrical conduction due to the impurity ions, thereby improving the voltage holding ratio.

When the curved line $l_1$ is compared with the curved line $l_2$, it is obvious that the voltage holding ratio is improved although the concentration of the conduction inhibitor is very small, namely, 0.01 wt %, and an apparent effect is shown at 0.1 wt %. The case where the concentration is not less than 1.0 wt % shows an effect such that the impurity ions intruding from the periphery can be ignored. Therefore, this example shows the effect even if the concentration of the conduction inhibitor is very small. Further, this example shows that when the concentration is not less than 0.1 wt %, the voltage holding ratio is improved to an extent that the lowering of the voltage holding ratio becomes practically insignificant from a viewpoint of the image display.

The reason why the conduction inhibitor inhibits the electrical conduction of the impurity ions is not clear at the moment. The inventors of this application think that structures of the epoxy group, the glycidyl group and the like in the bisphenol F epoxy resin forming the conduction inhibitor adsorb the impurity ions, or that any other mechanism inhibits the electrical conduction. In this example, the function of inhibiting the electrical conduction due to the impurity ions which intrude from the periphery as the time goes is confirmed, but needless to say, the effect is naturally exerted on the impurity ions originally mixed into the liquid crystal layer.

The inventors of this application took a measurement how the mixing of the conduction inhibitor influences another characteristics of the liquid crystal material. This is because although the conduction inhibitor is advantageous in that it maintains the voltage holding ratio high, the conduction inhibitor is only an impurity for the liquid crystal molecules, and a possibility that the conduction inhibitor inhibits the motion of the liquid crystal molecules is undeniable. Specifically, the inventors of this application examined how a voltage $V_{50}$ to be applied between the pixel electrode 7 and the common electrode 17 fluctuates when the transmittance of the light passing in a vertical direction with respect to the liquid crystal display cell becomes 50%. Since a change in the light transmittance is caused by the change in the alignment of the liquid crystal molecules, it is anticipated that the value of the voltage $V_{50}$ greatly fluctuates when the conduction inhibitor influences the motion of the liquid crystal molecules. In this measurement, samples 1 and 2 are fabricated as the liquid crystal display cells each in which the conduction inhibitor has any of the concentrations, and the values of the voltage $V_{50}$ to be applied in these samples are measured.

Figure 7:
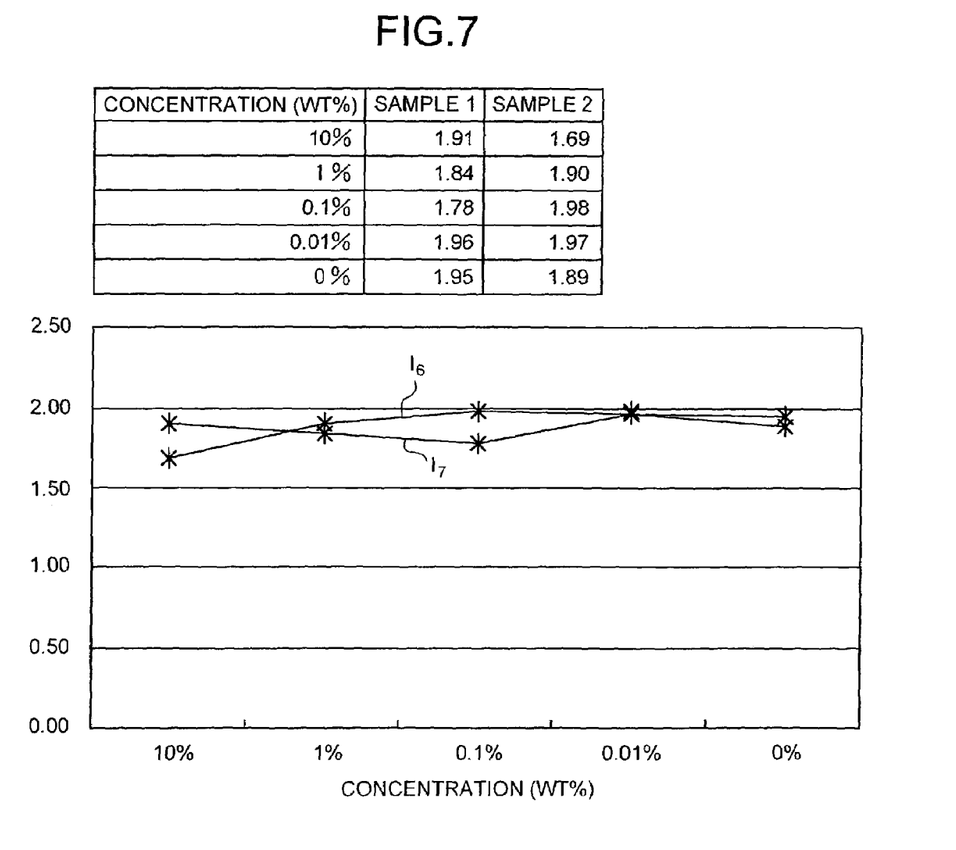
FIG. 7 is a graph and a chart of values of the voltage at which light transmittance becomes 50% in relation to the liquid crystal display cell according to the example.

Results of the measurement are shown on a graph and a table of FIG. 7. On the graph, a curved line $l_6$ shows measured data of the sample 1, and a curved line $l_7$ shows measured data of the sample 2. Although the value slightly fluctuates, the value of the voltage $V_{50}$ is generally equivalent to or not more than a value at the time of mixing no conduction inhibitor into the liquid crystal material. When the conduction inhibitor inhibits the motion of the liquid crystal molecules, it is anticipated that the voltage $V_{50}$ becomes high. The change in the light transmittance is caused by the change in the alignment of the liquid crystal molecules as described above, but when the motion of the liquid crystal molecules is inhibited, a higher voltage is required to change the alignment. The liquid crystal display cell according to this example adopts a normally white mode, and thus when the conduction inhibitor inhibits the motion of the liquid crystal molecules, inhibiting factors increase as the concentration is increased. When this understanding is considered, on the graph of FIG. 7, the voltage is supposed to shift to a high voltage side as the concentration is increased. However, on the graph shown in FIG. 7, the voltage $V_{50}$ slightly fluctuates, but the voltage $V_{50}$ does not increase greatly as the concentration is increased in both the samples 1 and 2. The case where no conduction inhibitor is mixed, namely, the concentration is 0 wt % is contrasted with the case where 10 wt % of the conduction inhibitor is mixed. Based on this contrast, the voltage $V_{50}$ has a smaller value in the case where 10 wt % of the conduction inhibitor is mixed. It can be concluded based on this result that the conduction inhibitor does not inhibit the motion of the liquid crystal molecules.

The inventors of this application measured a change in the response speed with respect to the applied voltage in order to confirm that the conduction inhibitor does not influence the motion of the liquid crystal molecules. This is because when the response speeds greatly differ depending on whether the conduction inhibitor is mixed into the liquid crystal material, the conduction inhibitor surely inhibits the motion of the liquid crystal molecules.

Figure 8:
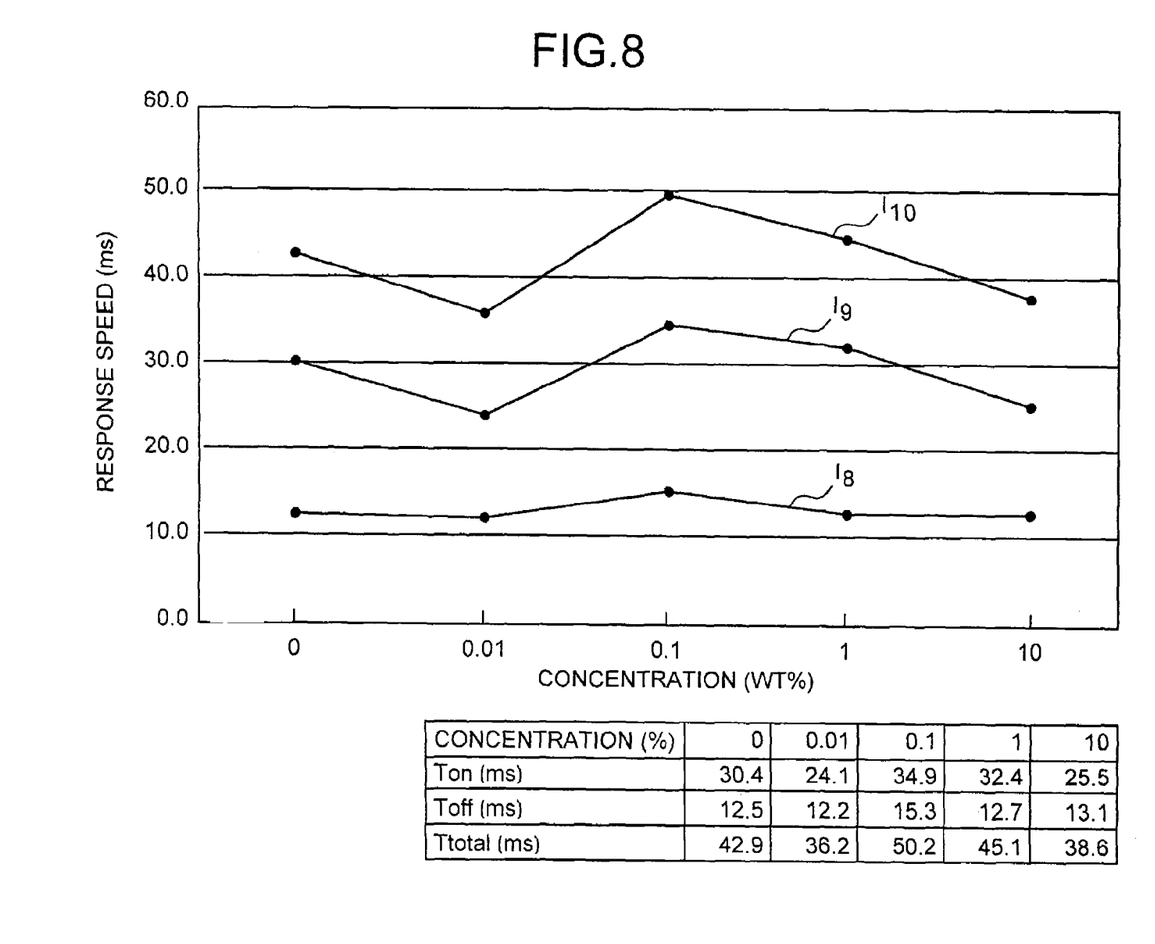
FIG. 8 is a graph and a chart of response time in response to applying of the voltage in relation to the liquid crystal display cell according to the example.

In FIG. 8, results of the measurement are shown on a graph and a table. On the graph of FIG. 8, a curved line $l_8$ shows a change in time $T_{ON}$ required for filling the charges from the source electrode 14 onto the pixel electrode 7 to change the alignment of the liquid crystal molecules. A curve line $l_9$ shows a change in time $T_{OFF}$ required for releasing the charges stored on the pixel electrode 7 to the source electrode 14 and returning the alignment of the liquid crystal molecules to its original state, and a curved line $l_{10}$ shows a change in a value obtained by totaling $T_{ON}$ and $T_{OFF}$. As is apparent from the graph shown in FIG. 8, the change in each time is not particularly correlated with the concentration of the conduction inhibitor. When the concentration of the conduction inhibitor is 0.1 wt %, the value slightly increases, but when the concentration is 1 wt %, the value becomes approximately equal to a value at the time of mixing no conduction inhibitor. When the concentration is 0.01 wt % and 10 wt %, the values are lower than the value at the time of mixing no conduction inhibitor. Therefore, similarly to the measured results shown in FIG. 7, it is found from the measured result shown in FIG. 8 that the conduction inhibitor does not inhibit the motion of the liquid crystal molecules.

The inventors of this application think that the reason why the conduction inhibitor does not inhibit the motion of the liquid crystal molecules is as follows. Since the bisphenol F epoxy resin used as the conduction inhibitor in this example has the one-dimensional structure as described before and n=0, the molecular weight obtains a value that is equivalent to or less than the liquid crystal molecules. It is thought that since the bisphenol F epoxy resin has the glycidyl group on both ends of the one-dimensional structure, the one-dimensional structure is maintained even if the bisphenol F epoxy resins chemically react with each other in the liquid crystal material to form a polymer, and thus the motion of the liquid crystal molecules is not influenced.

The following advantage to the liquid crystal display cell according to the first embodiment is derived from the above measured results. At first, even if the impurity with certain concentration exists in the liquid crystal layer 3, the high voltage holding ratio can be realized differently from the conventional technology. As explained above, the concentration of the impurity to be mixed into the liquid crystal layer is reduced to improve the voltage holding ratio in the conventional technology, but in the liquid crystal display cell according to the first embodiment, the conduction inhibitor as a so-called impurity is intentionally mixed to improve the voltage holding ratio. Such a technique is not disclosed before the application of the present invention, and thus this is an original technique of the inventors of this application. The liquid crystal display cell according to the first embodiment has the following advantage accompanied by the above advantage.

At first, the liquid crystal molecules composing the liquid crystal layer have an advantage that a degree of freedom to select a liquid crystal material is widened. The liquid crystal material should be conventionally composed of liquid crystal molecules with low solubility with respect to the impurity, but in the first embodiment, the conduction inhibitor is mixed with the liquid crystal material, thereby improving the voltage holding ratio regardless of the existence of the impurity ions with certain concentration.

Therefore, it is not necessary to suppress the mixing of the impurity ions from the viewpoint of the voltage holding ratio, and thus it is possible to form the liquid crystal material by using any liquid crystal molecules other than the fluorine-based nematic liquid crystal molecules. This means that, for example, the liquid crystal material can be formed by using liquid crystal molecules having high dielectric constant anisotropy that is expected to be adopted in the near future, thereby realizing the liquid crystal material having high voltage holding ratio as well as low voltage operation and high-speed response. It is predicted that any liquid crystal material that is conventionally inadequate for the use in the liquid crystal display cell using the TFT element, can be also used, and thus a degree of freedom to select liquid crystal materials is enlarged.

The liquid crystal material with which the conduction inhibitor is mixed is used, and therefore the liquid crystal display cell can be manufactured easily at a low cost. That is to say, since it is conventionally necessary to suppress the mixing of the impurity into the liquid crystal material to the utmost, cleanness should be heightened extremely for manufacturing the liquid crystal material and sealing the liquid crystal material between the substrates. When the conduction inhibitor is mixed, however, the electrical conduction of the impurity ions can be suppressed, thereby maintaining the voltage holding ratio high regardless of the existence of the impurity. Therefore, the manufacturing process can be executed with lower cleanness than that in the conventional technology, thereby manufacturing the liquid crystal display cell easily at a low cost.

The liquid crystal display cell further has an advantage such that the lowering of the voltage holding ratio due to deterioration with time can be suppressed. As shown in the measured result of the example, even when the impurity ions gradually intrude from the periphery as the time goes, the electrical conduction due to the intruded impurity ions can be suppressed by mixing the conduction inhibitor, thereby maintaining the voltage holding ratio high. Therefore, the liquid crystal display cell having long life can be realized.

The liquid crystal display cell further has an advantage such that the conduction inhibitor exerts only the effect of improving the voltage holding ratio and does not influence the characteristics other than the voltage holding ratio. Specifically, as shown in FIG. 7 and FIG. 8, the value of the voltage $V_{50}$ and the response speed do not differ significantly between the existence and the non-existence of the conduction inhibitor. Therefore, the liquid crystal display cell according to the first embodiment has an advantage such that the voltage holding ratio is improved and simultaneously the other characteristics are not deteriorated.

Figure 9:
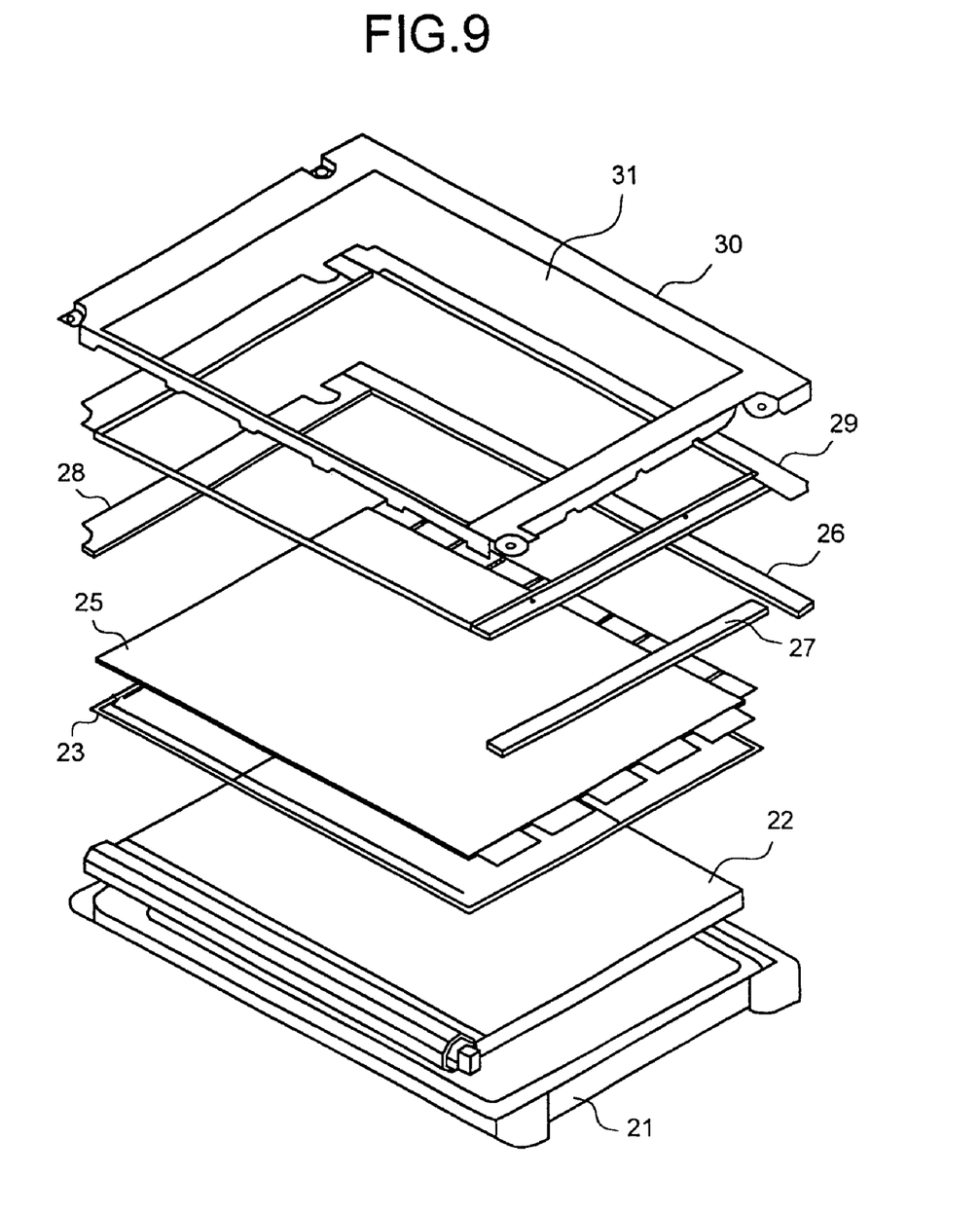
FIG. 9 is a perspective view of an entire structure of a liquid crystal display according to a second embodiment of this invention.

The liquid crystal display according to a second embodiment of this invention is explained below. The liquid crystal display according to the second embodiment has a structure using the liquid crystal display cell according to the first embodiment. FIG. 9 is an exploded diagram of the liquid crystal display according to the second embodiment. In FIG. 9, the respective members are separated from each other in order to facilitate the understanding of the structure of the liquid crystal display, but actually these members are combined to form the liquid crystal display according to the second embodiment.

The liquid crystal display according to the second embodiment has a backlight unit 22, a light-shielding spacer 23, and a liquid crystal display cell 25, arranged on a lower case 21 in a sequentially laminated manner. A drain circuit board 26, a gate circuit board 27, and an interface circuit board 28 are formed on the liquid crystal display cell 25, and these circuit boards are electrically connected with the liquid crystal cell 25. Further, a shield case 30 is arranged above the liquid crystal display cell 25 via an insulating sheet 29, and the shield case 30 has a display window 31 that defines a liquid crystal display area near its center.

The backlight unit 22 irradiates the liquid crystal display cell 25 with flat light that proceeds in the vertical direction. The backlight unit 22 has a structure such that light irradiated from a fluorescent lamp as a light source is reflected by a reflector provided on a bottom portion of the backlight unit 22 and passes through a light guide plate and a diffuser to become flat light that is input into the liquid crystal cell 25.

The liquid crystal display cell 25 is the same one explained in the first embodiment. Therefore, the liquid crystal display cell 25 contains the conduction inhibitor in the sealed liquid crystal, and even when the impurity ions with certain concentration exist in the liquid crystal, the voltage holding ratio can be maintained high.

An electronic circuit is formed on the drain circuit board 26 and the gate circuit board 27, and the electric circuit applies a predetermined voltage to the drain electrode and the gate electrode of the TFT element arranged in the liquid crystal display cell 25. Further, a predetermined electronic circuit is formed on the interface circuit board 28, and this electric circuit controls the drain circuit board 26 and the gate circuit board 27. A specified pixel electrode is selected by these circuit boards, and a voltage is applied to the electrode to change the light transmittance of each pixel and a desired image is displayed.

The liquid crystal material, the liquid crystal display cell, and the liquid crystal display of the present invention are explained in the first and second embodiments and the example, but the present invention is not limited to the embodiments and the example, and the person skilled in the art may come to think of various modified examples by using these embodiments and the like. In the first embodiment, for example, liquid crystal molecules other than the fluorine-based nematic liquid crystal molecules can be used as the liquid crystal material. As shown in the first embodiment and the example, the conduction inhibitor suppresses the electrical conduction due to the ions generated by resolving the impurity regardless of the composition of the liquid crystal molecules, and thus the liquid crystal molecules in the liquid crystal material do not have to be particularly limited. Therefore, nematic liquid crystal molecules other than the fluorine-based ones may be used, or molecules forming smectic liquid crystal, cholesteric liquid crystal, or the like may be used. Alternatively, these molecules may be mixed with each other to form the liquid crystal material.

As the aligned state of the liquid crystal molecules, it is possible to adopt an arbitrary mode such as a twisted nematic (TN) mode, an in-plane switching (IPS) mode, a super twisted nematic (STN) mode, a double super twisted nematic (D-STN) mode, a vertical alignment (VA) mode, and the like. This is because the conduction inhibitor is mixed into the liquid crystal material, thereby suppressing the electrical conduction due to the impurity ions regardless of the aligned state of the liquid crystal molecules.

As a driving unit as the switching element, any unit other than the TFT element 10, the signal line 8, and the gate line 9 may be used. This is because the voltage holding ratio is maintained high by the liquid crystal material in the present invention and the unit is not much correlated with the driving unit. Specifically, a metal insulator metal (MIM) driving unit or the like can be adopted.

In the second embodiment, a reflecting system in which external light such as sunlight is used as a light source, or a semi-transmission system may be adopted instead of the backlight unit 22.

Naturally, the liquid crystal material of the present invention can be widely used as materials forming an electro-optical device other than the liquid crystal display. The electro-optical device has a structure such that the liquid crystal material is sealed between the substrates each having an electrode. The liquid crystal material of the present invention can be used in, for example, a wrist watch, an air-tight window, a window of a building, a switching device in an optical system, a hand-held scanner, a mobile phone such as a cellular phone, a radio, an image forming device, a virtual reality device, a simulation device, an electric gating device, a reflecting grating, and a calculator. The liquid crystal material can be further used in a temperature sensor, a gas sensor, and the like by utilizing the characteristics of this material.

As explained above, according to the first to twelfth aspects of the invention, the liquid crystal material includes the conduction inhibitor for inhibiting the electrical conduction. Thus, it is possible to provide the liquid crystal material that keeps the voltage holding ratio at a high value even when the impurity is mixed.

According to the thirteenth aspect of the invention, the electro-optical device is formed by any one of the liquid crystal materials. Thus, it is possible to use the liquid crystal material having the above characteristics in a wide range of applications.

According to the fourteenth or fifteenth aspect of the invention, any one of the liquid crystal materials is used, and therefore the voltage holding ratio of the liquid crystal material can be increased to a high value. Thus, it is possible to provide the liquid crystal display cell having long life without unevenness on a display image.

According to the sixteenth or seventeenth aspect of the invention, any one of the liquid crystal cells is used, and therefore the voltage holding ratio of the liquid crystal material can be increased to a high value. Thus, it is possible to provide the liquid crystal display having long life without unevenness on a displayed image.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A liquid crystal material, comprising:
   liquid crystal molecules; and
   a conduction inhibitor mixed with the liquid crystal molecules for inhibiting electrical conduction due to an ionic substance floating in vicinity of the liquid crystal molecules.

2. The liquid crystal material according to claim 1, wherein the conduction inhibitor adsorbs the ionic substance floating in vicinity of the liquid crystal molecules to inhibit the electrical conduction.

3. The liquid crystal material according to claim 1, wherein the conduction inhibitor contains an epoxy resin.

4. The liquid crystal material according to claim 1, wherein the conduction inhibitor has a glycidyl group.

5. The liquid crystal material according to claim 1, wherein the conduction inhibitor contains a phenolic glycidyl ether type epoxy resin.

6. The liquid crystal material according to claim 1, wherein the conduction inhibitor has a viscosity of not more than 3000 poise at a temperature at which the liquid crystal molecules exhibit liquid crystal property.

7. The liquid crystal material according to claim 1, wherein the conduction inhibitor holds a one-dimensional structure in a state in which the conduction inhibitor is practically uniformly mixed with the liquid crystal molecules.

8. The liquid crystal material according to claim 1, wherein the conduction inhibitor is a bisphenol F epoxy resin represented by the following formula (1):

12. The liquid crystal material according to claim 1, wherein the conduction inhibitor is mixed with a concentration in a range between 0.01 wt % and 10 wt %.

13. The liquid crystal material according to claim 1, wherein the conduction inhibitor is mixed with a concentration in a range between 0.1 wt % and 10 wt %.

14. An electro-optical device, comprising:
   a plurality of substrates each of which has an electrode and which are arranged in an opposed manner so as to be separated by a predetermined distance from each other; and
   a liquid crystal layer formed by a liquid crystal material sealed between the substrates, the liquid crystal material including
   liquid crystal molecules; and
   a conduction inhibitor mixed with the liquid crystal molecules for inhibiting electrical conduction due to an ionic substance floating in vicinity of the liquid crystal molecules.

15. A liquid crystal display cell, comprising:
   a first substrate having a plurality of electrodes on an inner surface of the first substrate;
   a second substrate arranged so as to be separated from the first substrate by a predetermined distance and be opposed to the first substrate; and
   a liquid crystal layer that is sealed into a region formed by the inner surface of the first substrate and an inner surface of the second substrate, and is formed by a liquid crystal material, the liquid crystal material including
   liquid crystal molecules; and
   a conduction inhibitor mixed with the liquid crystal molecules for inhibiting electrical conduction due to an ionic substance floating in vicinity of the liquid crystal molecules.

(1)

9. The liquid crystal material according to claim 1, wherein the conduction inhibitor is a bisphenol A epoxy resin represented by the following formula (2):

16. The liquid crystal display cell according to claim 15, further comprising:

(2)

10. The liquid crystal material according to claim 8, wherein n of the conduction inhibitor is in a range between 0 and 1.

11. The liquid crystal material according to claim 9, wherein n of the conduction inhibitor is in a range between 0 and 1.

a plurality of electrodes arranged in a matrix on the inner surface of the first substrate; and
a plurality of thin film transistors arranged correspondingly to the electrodes.

17. A liquid crystal display, comprising:
a liquid crystal display cell including a first substrate having a plurality of electrodes on an inner surface of the first substrate;

a second substrate arranged so as to be separated from the first substrate by a predetermined distance and be opposed to the first substrate, and a liquid crystal layer that is sealed into a region formed by the inner surface of the first substrate and an inner surface of the second substrate and is formed by a liquid crystal material, the liquid crystal material including liquid crystal molecules, and a conduction inhibitor mixed with the liquid crystal molecules for inhibiting electrical conduction due to an ionic substance floating in vicinity of the liquid crystal molecules;

a voltage applying unit that is electrically connected with the electrodes arranged on the liquid crystal display cell and applies a predetermined voltage to the electrodes;

a control unit that controls the voltage applying unit based on image information input from outside; and a frame member that has the liquid crystal display cell, the voltage applying unit, and the control unit provided therein, and has a display window for defining an effective display screen area.

18. The liquid crystal display according to claim 17, further comprising a backlight source that irradiates the liquid crystal cell with flat light.

* * * * *